May 23, 1961   C. M. JENKINS, SR   2,984,928
FISHING LURE
Filed Feb. 17, 1958

Charles M. Jenkins, Sr.
INVENTOR.

BY *Clarence A. O'Brien*
*and Harvey B. Jackson*
Attorneys

United States Patent Office 2,984,928
Patented May 23, 1961

2,984,928

FISHING LURE

Charles M. Jenkins, Sr., 1607 Parnell St., Augusta, Ga.

Filed Feb. 17, 1958, Ser. No. 715,794

8 Claims. (Cl. 43—42.09)

This invention relates to a novel fishing lure characterized by a plug imitating a suitable bait, said plug having an oblique-angled scoop at its forward end and being provided at its rearward end with a peculiarly designed tail member and, if desired, a fish hook, the fish hook and tail member being detachably mounted on said rearward end.

One improvement has to do with a lure equipped with a scoop, the purpose of which is to enable the lure to plunge to great depths and maintain its diving range to a maximum, lasting from contact with the water until the lure has been retrieved, said scoop adding assistance in preventing hook sections from fouling in obstructions found in practically all fresh water fishing sites.

With respect to one of the two embodiments of the invention, novelty is predicated on the aforementioned construction and wherein the trailing or rear end of the body is bifurcated, one of the furcations being provided with a sleeve nut to accommodate an accessible and readily insertable and removable eye-bolt, the eye-bolt constituting a single and handy fastener for a swivelly mounted fish hook and a swivelly and detachably mounted tail-like member, to the end that a variety of tail-like members may be utilized and exchanged one for the other in a manner to change the general or over-all appearance of the lure and to render it versatile in construction and use.

With reference now to the other and preferred embodiment of the invention this embodiment is characterized by a buoyant plug constituting a lure and having a body provided at the forward end with a head. The rearward end of the body is bifurcated to provide a pair of upper and lower furcations. The furcations have their inward surfaces widely spaced apart and in divergent relationship. An accessory hitching and retaining pin passes slidingly through an opening which is provided therefor in a median portion of the lower furcation. When the pin is in place the median and upper portions thereof normally bridge the space between the furcations. However, the pin is retractable in a manner to allow selectively applicable and removable accessories to be attached. One accessory, for example, is a tail member. This is to be detachably connected to the pin and then becomes a trailing component of the plug, the upper end of the pin being adapted to abut the upper furcation. The lower portion of the pin depends below the ventral surface of the lower furcation and provides a hitching and pivoting member for another accessory, for example, a fish hook. Manually regulable means is mounted on the body of the plug and is such as to secure the pin operatively on the lower furcation and to allow the pin to be readily moved from a retaining to a releasing position.

Novelty is predicated on the above construction and wherein the upper end of the pin is provided with a stop which is larger than the diameter of the hole in the lower furcation through which the pin slides. The stop serves to prevent the pin from sliding through the opening in a downward direction so that the pin is at all times retained and is not susceptible of being misplaced or lost.

In both forms of the invention the ventral side of the lower furcation has a substantially flat bearing or thrust surface and an opening which is aligned with the opening in the lower furcation. The terminal of the lower portion of the pin has a head spaced from the bearing so that the part of the accessory which is interposed between the bearing and the head is not only effectually hitched in place but is free to pivot and turn. More specifically the lower terminal end of the pin has a headed neck providing a keeper. The means cooperating therewith is an openable and closable latch which is pivotally mounted on the ventral surface of the body, said head being releasably engaged by the latch.

Both forms of the invention feature other structural distinctions and advantageous improvements which will be more clearly revealed in the following specification.

It is pointed out by way of introduction through the description of the details that this application is a continuation-in-part of my pending application Serial No. 568,564 of February 29, 1956 which is now abandoned.

Figure 6:
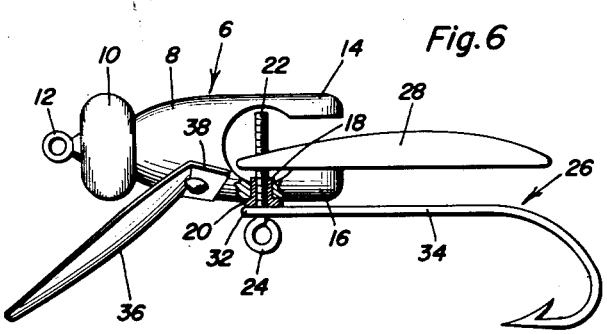
Fig. 6 is a view in side elevation similar to Fig. 1 but with portions broken away and shown in section and illustrating a second embodiment of the invention.

Referring first to the modification (Fig. 6) this comprises a buoyant plug here referred to, as an entity, by the numeral 6. This plug may be of wood, plastic or other suitable material and it is characterized by a body 8, the forward or leading end of which is provided with a suitable head 10 having an eye 12 to which the fishing line (not shown) is connected. The rear or trailing end is bifurcated and the furcations denoted by the numerals 14 and 16 are substantially parallel. The furcation 16 is provided with a hole into which a sleeve nut 18 is snugly fitted and anchored. The nut is provided at one end with a head 20 serving as a bearing and also as an abutment to assist in maintaining the nut in place. The nut is internally screw-threaded to accommodate the screw-threaded shank 22 of an eye-bolt 24. The eye end is situated below the ventral side of the body where it is accessible to assist the user in attaching and detaching the fish hook 26 and also the tail attachment or member 28 to the shank 22. The portion of the shank between the eye and the threaded portion is smooth to accommodate the eye 32 on the shank 34 of the fish hook 26. This construction provides for detachable mounting of the fish hook and also allows it to swivel and swing back and forth in a horizontal plane through a limited circular path. Fitting between the furcations is the forward end of the tail-like attachment 28 and this has a hole therein which it fitted over and thus detachably and swivelly mounted on that portion of the shank 22 which extends across the space between the furcations 14 and 16.

Extending from the leading end and projecting at an oblique angle below the ventral side of the plug is a dished water scoop 36. The rear end of the scoop is forked and the fork arms 38 straddle the body and are screwed or otherwise attached thereto.

The tail-like attachment or member 28 may swing 90° to the right or the left or through an approximate half circle at 180°.

A feature of the lure (Fig. 6 only) is the threaded eye-bolt 24 and sleeve nut 18 capable of being operated without the aid of any mechanical device to install and remove tail-piece 28 (bucktail and feather streamers, pork rind lengths, swivel attachments and other combinations) desired by the operator. In fact, it is altogether possible to satisfactorily operate the lure independently of the tail-like member 28 or any chosen attachment to facilitate balance.

Figure 1:
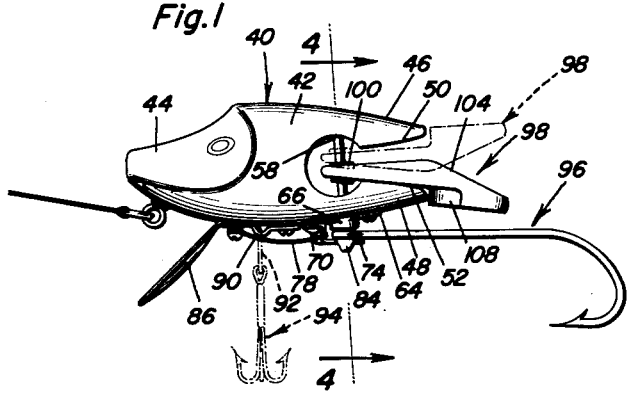
Fig. 1 is a side elevation of the improved lure showing it rigged with the aforementioned reversible tail member and a long-shank fishing hook.
Figure 4:
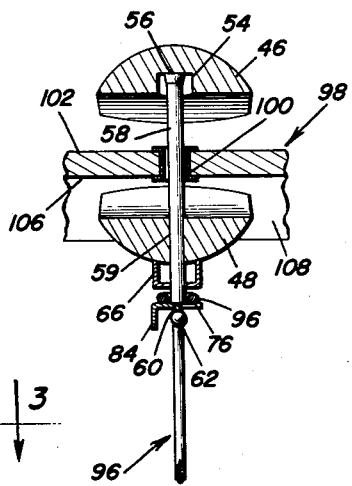
Fig. 4 is an exaggerated cross-section with parts appearing in elevation on the vertical or transverse line 4—4 of Fig. 1.
Figure 2:
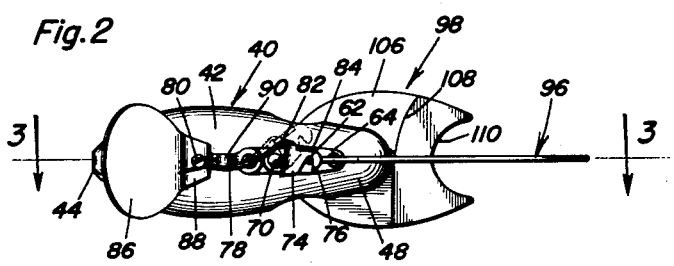
Fig. 2 is a bottom plan view of the same.
Figure 3:
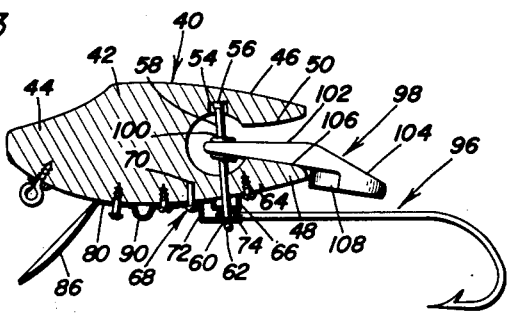
Fig. 3 is a central longitudinal section with parts in elevation, taken on the plane of the line 3—3 of Fig. 2.

Reference is now made to the preferred embodiment of the invention as seen in Figs. 1 to 5 inclusive. With reference in particular to Fig. 1 the buoyant wooden or equivalent plug is denoted by the numeral 40 and is characterized by a suitably shaped body portion 42 and a head on the forward or leading end at 44. Again the rearward end of the body is bifurcated and the furcations are denoted as an upper furcation 46 and a lower furcation 48. It will be seen that the opposed inward surfaces of the furcations are inclined, said surfaces 50 and 52 being in approximate rearwardly divergent relationship. As seen in Figs. 3 and 4 the surface of the upper furcation is preferably but not necessarily provided with a shallow recess or socket 54 to accommodate the upper headed end 56 of the linearly straight hitching pin 58. This pin is slidable (Fig. 4) through a hole or opening 59 provided therefor in the lower furcation. When the pin is in its up or hitching position the lower end portion depends below the ventral side of the lower furcation where it is provided with a reduced neck 60 and a head 62 providing a keeper. A thin sheet metal or equivalent plate 64 is suitably fastened against the central part of the ventral side of the plug primarily to the lower furcation. The median portion of this plate is indented or extruded to provide a cup-like or hollow boss 66. The lower side of this boss is substantially flat and it provides a bearing and is centrally apertured with the aperture in alignment with the hole 59 and the headed end of the hitching pin extends below the boss 66. The latch 68 serves to hold the pin in its normal retaining position and has one end portion pivotally mounted on a screw or equivalent fastening 70 (Fig. 3). The other swingable end portion of the latch is generally L-shaped and the short limb 72 thereof provides a shoulder. The longer limb 74 is normally parallel to and spaced from the bearing surface on the boss 66. This limb has a keeper notch 76 (Fig. 2) which releasably engages with the neck 60 of the keeper head 62.

Figure 5:
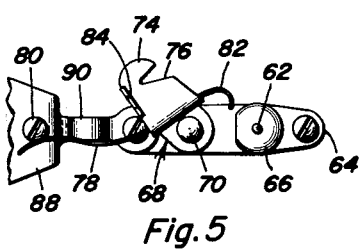
Fig. 5 is a view showing the cooperation of the latch and spring with the latch in its temporarily usable open position allowing for interchange of an accessory.

With further reference to Figs. 2 and 5 it will be seen that the pivotally mounted latch is spring-biased and thus held in its retaining position. This is accomplished through the medium of a length of suitable spring wire 78 having one end anchored at 80 and the other end free and formed with a lateral terminal of hook-like form 82 which is cooperable with the shoulder 72. The spring normally exerts pressure on the shoulder in such a way that the latch is fastened. However, when it is desired to manually push the latch to its temporarily usable openable position this is accomplished by way of a lateral flange or finger-piece 84 with which the latch is provided. By exerting pressure against the flange assuming that the latch is closed, and pushing the latch in a direction from right to left in Fig. 2 for example the tension of the spring is temporarily overcome and the latch swings around to an approximate 135° angle. When in this position the spring now exerts pressure on the latch to hold it open. This may be treated as the latch passing beyond dead-center and being held in its open position by the same spring which also serves to keep it normally closed.

In this embodiment the dished water scoop 86 is provided with a relatively narrow shank portion 88 which as shown is further narrowed and provided with a depending U-bend 90 providing suspension for a split ring 92 (Fig. 1) which may be used in supporting, if desired, an attachable and detachable multiple prong fish hook 94.

The long shank fish hook is denoted by the numeral 96 and the eye on the forward end thereof is releasably clamped between the bearing surface on the boss 66 and the spring-biased latch in the manner shown. By opening the latch this fish hook may be detached and replaced either with another fish hook or some other accessory such as a bucktail with an eye and so on.

The tail member 98 is approximately ovate in plan except that the rear end and forward end and median portion which is installed between the furcations is provided with an opening lined with a grommet or bushing 100 through and beyond which the hitching pin extends as shown in the drawing. This member is much wider at its widest portion than the cross-section of the plug. It has an up side and a down side in relation to the views of the drawing. The up side has a planar surface 102 which may be described as slanting forwardly and somewhat downwardly. The portion which projects beyond the terminals of the furcations slants downwardly and rearwardly as at 104. The down or bottom side or surface has a substantially flat portion 106 as seen in Fig. 2 and this flat portion projects slightly beyond the terminal ends of the furcations where it merges with a right angular transversely disposed shoulder 108. The rear end is formed with a substantially semi-circular notch 110 which defines a fishtail terminal.

In both forms of the invention the tail member is reversible and in Fig. 1 the manner in which the tail member 98 is reversed is illustrated in full and dotted lines. The retractable latching pin makes it possible to attach and detach and reverse the tail member and also the fishhook 26 or 96 as the case may be. It is evident that the hitching pin 24 or 58 as the case may be serves not only to detachably mount the tail member and fishhook, it may be employed (not shown) to attach a bucktail or any other equivalent fisherman's accessory. Also, the tail member 98 may be completely detached and the hook 96 substituted therefor. In either event the readily openable and closable spring biased latch 68 performs adequately and satisfactorily to enable the plug to be rigged in keeping with the requirements of the user.

It may be added in conclusion that both forms of the invention serve to provide the prospective user with a unique and diversified fishing device. Numerous features and advantages which obtain in the construction shown could be presented here but are being omitted to simplify the disclosure and to enable the reader to focus attention on the structural characteristics.

Minor changes within the scope of the invention as claimed may be resorted to in actual practice if desired.

What is claimed as new is as follows:

1. A bait casting, hook-carrying fishing lure comprising a buoyant plug constituting a lure and having a body provided at its forward end with a head, the rearward end of said body being bifurcated and providing an upper furcation and a lower furcation, a tail member approximately ovate in plan having a fish-tail-notch at its trailing end, said tail member being detachable and reversible, one side being partially flat and formed with a right angled upstanding crosswise shoulder providing a water baffle, the other side having a forward downwardly inclined planar surface portion and a relatively shorter rearward downwardly inclined surface portion, the forward end of said tail member having a hitching hole, and a retractible hitching pin mounted slidingly on one of said furcations and passing releasably through said hitching hole.

2. An artificial fishing lure comprising a plug having a head at a leading end, the trailing end of said plug being bifurcated and defining a pair of spaced parallel upper and lower furcations, the lower one of said furcations being provided intermediate its forward and rearward ends with a right angularly disposed internally screw-threaded sleeve nut, the upper end of said sleeve nut opening into the space between said furcations and the lower end being disposed and opening in a plane below the bottom of said lower furcation, an eye-bolt having a threaded shank screwed upwardly through said nut, the upper portion of said shank spanning the space between said furcations, the eye of said bolt being situated and exposed below the bottom of said furcation where it is accessible for freedom of operation, a fish hook having a shank with a hook at one end and an eye at the other end, said eye being swivelly and removably mounted on the shank between the eye of the eye-bolt and the adjacent lower end of said sleeve nut, and a rigid blade constituting a tail member, the forward end portion of said blade projecting into the space between said furcations and having a centered aperture therein of a size greater than the cross-section of the eye-bolt shank, said eye-bolt shank passing through the aperture and providing a detachable as well as a swivel connection, the rear portion of said blade projecting beyond the rear ends of said furcations and being thus swivelly mounted and freely swingable 90° to the left and 90° to the right of the axial center of said plug.

3. The structure defined in claim 2 and wherein the shank of said fish hook is of a length greater than the length of said blade and said blade is of a thickness appreciably less than the space between the inward surfaces of the furcations in order to promote freedom of movement of the blade relative to the shank of the eye-bolt and said furcations.

4. The structure defined in claim 2 and a relatively wide dished water scoop disposed at an oblique angle to the ventral side of the leading end portion of said body and having its leading end projecting beyond the head of the body and having its opposite end formed into a fork, said fork defining arms and said arms straddling said body and being fastened thereto.

5. A bait casting, hook-carrying fishing lure comprising, in combination, a plug constituting a lure and having a forward end embodying a head, and a body, the rearward end of said body being bifurcated and providing an upper furcation and a lower furcation and an intervening gap between said furcations, said upper furcation being imperforate, the median portion of the lower furcation having a projectible and retractible accessory hitching, retaining and pivoting pin mounted adjustably thereon, the upper end portion of said pin normally bridging the gap between the furcations and being adjustable toward and from the inner surface of the upper furcation but physically disconnected therefrom, said upper end of said pin being retractible and movable away from the upper furcation to provide a space between itself and the said upper furcation sufficient to allow a tail member to be utilized between the furcations and in said gap, and a tail member insertable and removable by way of the gap and of a cross-sectional thickness less than the space between the furcations defining said gap, said pin passing through an opening provided therefor in the cooperating forward end portion of the tail member, said tail member being free to move up and down in the space between the furcations and from side to side, said pin having a lower end portion depending below the ventral surface of the lower furcation and terminating in a head and providing a hook hitching and pivoting member, and a fish hook having an eye on a shank portion of the hook, said pin passing through said eye, and said eye being operatively located between the head of the pin and said lower furcation and being thus assembled and held in place.

6. A bait casting, hook-carrying fishing lure comprising a buoyant plug constituting a lure and having a body provided at its forward end with a head, the rearward end of said body being bifurcated and providing an upper furcation and a lower furcation therebeneath, an accessory hitching and retaining pin passing adjustably through opening means provided therefor in a median portion of the lower furcation, the upper and median portions of said retaining pin normally bridging the space between the furcations, the upper end of said pin being physically disconnected from the upper furcation but adjustable toward and from it and being retractible in a manner to open a space between said upper end of said pin and the adjacent surface of the upper furcation sufficient to allow the introduction of an end portion of the readily applicable and removable accessory, said accessory comprising a tail member the leading end of which is inserted through the constantly existing space between the furcations and which is removably and pivotally hitched on said pin, the cross-sectional thickness of the leading end of the tail member being appreciably less than the constantly existing space between the furcations so that the tail member is allowed to rise and fall vertically in the space and is permitted to swing laterally from side to side, the upper end portion of said pin being enlarged and constituting a stop, said stop being larger in cross-section than the diameter of the opening in the lower furcation and serving to check the upward adjustment movement of the pin and also preventing the pin from becoming disconnected from the lower furcation, the lower portion of said pin depending below the ventral surface of the lower furcation and terminating in a head, said headed lower end of said pin providing a hitching and pivoting member for a fish hook, and the fish hook having a shank and an eye, said eye being hingedly attached to the lower headed end of said pin.

7. A bait casting, hook-carrying fishing lure comprising a buoyant plug constituting a lure and having a body provided at its forward end with a head, the rearward end of said body being bifurcated and providing an upper furcation and a lower furcation therebeneath, an accessory hitching and retaining pin passing adjustably through opening means provided therefor in a median portion of the lower furcation, the upper and median portions of said retaining pin normally bridging the space between the furcations, the upper end of said pin being physically disconnected from the upper furcation but adjustable toward and from it and being retractible in a manner to open a space between said upper end and the adjacent surface of the upper furcation sufficient to allow the introduction of an end portion of a readily applicable and removable accessory, an accessory comprising a tail member the leading end of which is inserted through the constantly existing space between the furcations and which is removably and pivotally hitched on said pin, the cross-sectional thickness of the leading end of the tail member being appreciably less than the constantly existing space between the furcations so that the tail member is allowed to rise and fall vertically in the space and is permitted to swing laterally from side to side, the upper end portion of said pin being enlarged and constituting a stop, said stop being larger in cross-section than the diameter of the opening in the lower furcation and serving to check the upward adjustment movement of the pin and also preventing the pin from becoming disconnected from the lower furcation, the lower portion of said pin depending below the ventral surface of the lower furcation and terminating in a head, said headed lower end of said pin providing a hitching and pivoting member for a fish hook, and a fish hook having a shank and an eye, said eye being hingedly attached to the lower headed end of said pin, said lower furcation being provided on its ventral side with a flat-surfaced friction-resisting bearing, said bearing having an opening aligned with the opening in said lower furcation, a cooperating lower portion of said pin passing downwardly through the opening in the bearing, and the aforementioned head of said pin being spaced below said bearing whereby the eye on the hook is interposed with requisite operability between the head of said pin and the bearing.

8. A bait casting, hook-carrying fishing lure comprising a buoyant plug constituting a lure and having a body provided at its forward end with a head, the rearward end of said body being bifurcated and providing an upper and a lower furcation, an accessory hitching and retaining pin passing slidingly through an opening provided therefor in a median portion of the lower furcation, the median and upper portions of said pin normally bridging the space between said furcations but being retractible in a manner to allow a selectively usable applicable and removable accessory, a tail member for example, to be detachably connected to said pin and to become a trailing component of the plug, the upper end of said pin being adapted to abut the upper furcation, the lower portion of said pin depending below the ventral surface of the lower furcation and providing a hitching and pivoting member for a fish hook, the lower terminal end of said pin having a headed neck providing a keeper, and a manually openable and closable latch pivotally mounted on the ventral surface of said body and releasably engaged with said keeper, said keeper being pivotally mounted at one end, the other end being L-shaped in edge elevation, the short limb thereof constituting a shoulder and the long limb having a keeper seating notch for reception of the neck of said keeper, and a springy wire having one end anchored on said ventral surface, the other end being free and terminating in a hook, said hooked end being in constant cooperating engagement with the shoulder and serving not only to hold and keep the keeper closed but also serving to temporarily exert pressure against and to thus keep the keeper open.

References Cited in the file of this patent

UNITED STATES PATENTS

| | | |
|---|---|---|
| 2,238,832 | Thoren | Apr. 15, 1941 |
| 2,307,478 | Adam | Jan. 5, 1943 |
| 2,674,060 | Simmons | Apr. 6, 1954 |